April 18, 1967     L. D. CROSS     3,314,728

WHEEL WEIGHTS FOR VEHICLES

Filed Feb. 8, 1965

INVENTOR
LEWIS D. CROSS

BY *Chas. R. Fay,*

ATTORNEY

United States Patent Office 3,314,728
Patented Apr. 18, 1967

3,314,728
WHEEL WEIGHTS FOR VEHICLES
Lewis D. Cross, 25 Nelson St., North
Grafton, Mass. 01536
Filed Feb. 8, 1965, Ser. No. 430,824
1 Claim. (Cl. 301—41)

This invention relates to new and improved wheel weight constructions particularly adapted for the driving wheels of vehicles to place weight directly on these wheels for extra traction, and to avoid the usual practice of placing weights in the body of the vehicle over the springs. By placing the weights on the wheels the springs of the car are not affected, whereas with weights in the body of the car the springs are undesirably compressed, especially on rough terrain.

One of the principal objects of the present invention is the provision of a fixture which can be applied to any usual vehicle wheel and which can remain in place at all times, being covered by the usual hub cap. This fixture does not interfere in any way with the application of the hub cap to the wheel. However the fixture provides for the attachment thereto, in the absence of the hub cap, of a weight so that in the Fall of the year the hub cap may be removed and the weight applied. In the Spring, the weight being removed, the hub cap can be replaced, and the fixture remains in place on the wheel without affecting it in any way. The weights therefor can be easily applied and detached e.g., at the time that the driver's snow tires are applied and removed.

Other objects and advantages of the invention will appear hereinafter.

Reference is to be had to the accompanying drawings in which.

Figure 1:
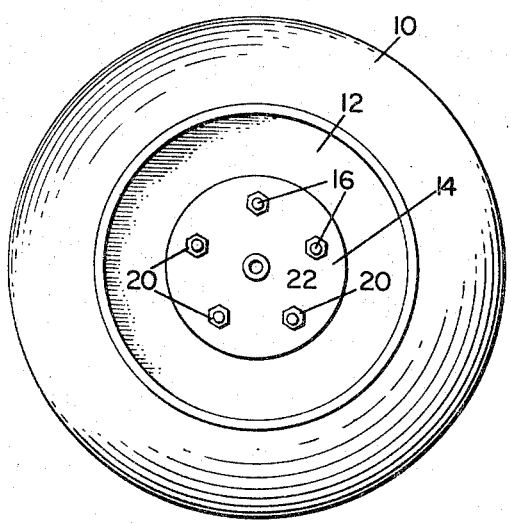
FIG. 1 is a view in front elevation showing the fixture in place on the vehicle wheel.

In illustrating the invention, the reference numeral 10 illustrates a conventional tire mounted on a conventional wheel 12 in the usual manner. In FIG. 1 there is shown a flat round plate 14. The shape of this plate may be as desired but round is preferable. This plate forms the fixture which is provided with a sufficient number of spaced holes through it to receive the conventional wheel mounting lugs 16 found on ordinary vehicle wheel hubs 18. These lugs extend through the holes in the plate 14 and have applied thereto the usual lug nuts 20. Mounted centrally of the plate 14 there is a threaded post 22 firmly fixed by any desired means and extending in a general axial relation with respect to said plate.

Figure 4:
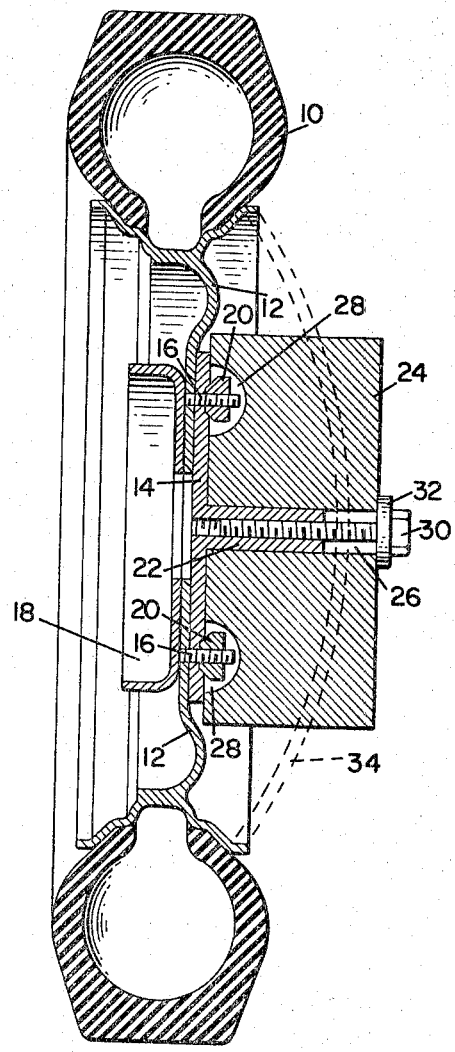
FIG. 4 is a cross sectional view through the wheel showing the bracket and the weight in position.
Figure 2:
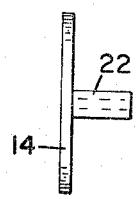
FIG. 2 is an edge view of the fixture per se.
Figure 3:
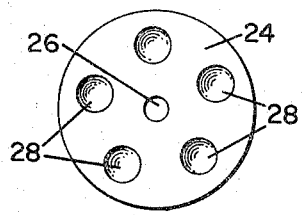
FIG. 3 is a rear view of the weight.

The weight which is to be applied to the fixture 14 may also assume any general shape but a cylindrical form is preferred. This weight is indicated by the reference numeral 24 and it has a central opening at 26 therethrough which receives the stud or post 22. The weight is also preferably provided with a series of recesses 28 to accommodate the lug nuts 20. These recesses may appear at both sides of the weight or only at one side thereof as may be desired but in any event the weight is applied to the stud as shown in FIG. 4 and a heavy machine screw as at 30 is applied to the threaded stud 22 in the manner shown using a heavy washer 32 under it as may be desired or necessary.

It will be seen that the weight 24 accommodates the lug nuts and in turn these will prevent any possible rotation of the weight with respect to the wheel. The screw 30 holds the weight against the plate 14. It will be seen as shown in FIG. 4 that the hub cap 34 shown in broken lines may be applied to the device if the weight is removed without however removing or affecting in any way plate 14 and its stud. Thus it will be clear that it is very simple to apply the weights to the wheels when desired after removing the hub cap, and conversely to remove the weights and replace the hub caps when the weights are no longer desired or needed.

Most automobile wheels as presently made are not flat in the central portion thereof, i.e., the area covered by the plate 14, and when the lug nuts 20 are tightened down, the plate 14 may be slightly indented in these areas so that there is an additional interengagement between the plate or fixture 14 and the wheel itself.

Therefore it will be seen that by a relatively simple construction a very convenient wheel weight can be applied where it is best utilized. With very little effort and inconvenience the vehicle may be made much safer for winter driving so that full advantage may be taken for instance of the use of snow tires and in general obviating any need for chains on the tires.

Figure 5:
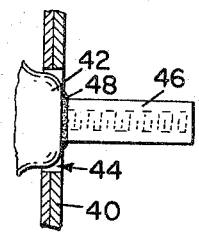
FIG. 5 is a partial view showing a modification.

Turning now to FIG. 5 there is shown an alternative form of the invention therein. In this case the plate or fixture 14 is dispensed with. The demountable wheel itself is indicated at 40. This wheel is secured to the hub in the usual manner. The hub has a central portion generally indicated at 42 which appears in the central opening at 44 of the usual wheel when it is applied in the usual manner. A cylindrical stud 46 may be welded at one end as at 48 to the hub 42. This stud is otherwise the same as the threaded post 22 and is located and utilized in the same manner to receive the weight 24. The weight is the same and is secured in place in the same manner as before described.

The construction which comprises this invention has been found to be beneficial particularly as to the added traction, not only for going on snow and ice, but also for hauling trailers and the like. Furthermore, cornering and handling in general are found to be greatly improved so that the weights are found to be of benefit even in the summer when there is ordinarily no need for snow tires, etc.

Having thus described my invention and the advantages thereof, I do not wish to be limited to the details herein disclosed, otherwise than as set forth in the claim, but what I claim is:

A wheel weight for wheeled vehicles having wheels and tires wherein the wheels are secured to the vehicle by means of lugs and lug nuts, said wheel weight construction comprising a flat disc having apertures receiving said lugs, the lug nuts being then applied to the lugs for securing the disc in fixed relation with respect to said wheel, a threaded stud extending centrally outwardly axially of said disc, and a one piece solid weight of generally cylindrical form, said weight having an axial passage therethrough receiving said stud, and means for securing said weight to said stud comprising a threaded bolt, the stud being hollow and threaded.

References Cited by the Examiner

UNITED STATES PATENTS

| | | | |
|---|---|---|---|
| 425,635 | 4/1890 | Schadt | 301—117 |
| 1,447,011 | 2/1923 | Brandt | 301—128 |
| 2,624,639 | 1/1953 | Lyon | 301—37 |
| 2,780,497 | 2/1957 | Cameron | 301—41 |
| 2,784,036 | 3/1957 | Dubbe | 301—41 |
| 2,859,065 | 11/1958 | Darby | 301—41 |

BENJAMIN HERSH, Primary Examiner.

R. J. JOHNSON, Assistant Examiner.